(12) United States Patent
Sui et al.

(10) Patent No.: US 10,979,488 B2
(45) Date of Patent: Apr. 13, 2021

(54) METHOD FOR INCREASING FILE TRANSMISSION SPEED

(71) Applicant: International Business Machines Corporation, Armonk, NY (US)

(72) Inventors: Guang Han Sui, Beijing (CN); Guang Ya Liu, Xian (CN); Xu Zhao, Xian (CN); Long Long Cao, Xian (CN); Dong Yu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/193,031

(22) Filed: Nov. 16, 2018

(65) Prior Publication Data

US 2020/0162538 A1 May 21, 2020

(51) Int. Cl.
*H04L 29/08* (2006.01)
*G06F 11/16* (2006.01)
*G06F 16/178* (2019.01)
*H04L 29/06* (2006.01)

(52) U.S. Cl.
CPC .......... *H04L 67/06* (2013.01); *G06F 11/1658* (2013.01); *G06F 16/178* (2019.01); *G06F 2201/85* (2013.01); *H04L 67/42* (2013.01)

(58) Field of Classification Search
CPC ............................ G06F 16/178; G06F 2201/85
See application file for complete search history.

(56) References Cited

U.S. PATENT DOCUMENTS

| 7,349,906 B2 | 3/2008 | Cherkasova |
| 7,454,408 B2 | 11/2008 | Koffron |
| 7,464,176 B2 | 12/2008 | Cohen et al. |
| 8,341,285 B2 | 12/2012 | Eshwar et al. |

(Continued)

FOREIGN PATENT DOCUMENTS

| CN | 101631143 A | 1/2010 |
| CN | 107113290 A | 8/2017 |

(Continued)

OTHER PUBLICATIONS

Sinha, "Data Transfer Nodes for Cloud-Storage Providers," https://pdfs.semanticscholar.org/a94c/da121ff8f8bba45cb37bde332bf48ffac7e3.pdf, pp. 1-77, ©2016 Soham Sinha.

(Continued)

*Primary Examiner* — Matthew M Kim
*Assistant Examiner* — Matthew N Putaraksa
(74) *Attorney, Agent, or Firm* — Peter K. Suchecki

(57) ABSTRACT

Provided is a system and method for increasing file transmission speed of a server, and a method for replicating a data object over a plurality of nodes. The system includes a server communicatively coupled to a plurality of nodes. The server may detect a plurality of nodes. The server may determine that a data object stored by the server is to be replicated to the plurality of nodes. The server may divide the data object into a plurality of data pieces. The server may send a different data piece to each node of the plurality of nodes. Each node may receive the different data piece from the server. Each node may send a copy of the received data piece to all other nodes. Each node may receive copies of all other data pieces from the other nodes. Each node may replicate a full copy of the data object.

17 Claims, 9 Drawing Sheets

(56) References Cited

U.S. PATENT DOCUMENTS

| | | | |
|---|---|---|---|
| 8,856,286 B2 | 10/2014 | Barsness et al. | |
| 9,715,594 B2* | 7/2017 | Barbas | H04N 21/2318 |
| 9,906,587 B2 | 2/2018 | Kim | |
| 10,162,828 B2 | 12/2018 | Foster | |
| 2004/0088380 A1 | 5/2004 | Chung et al. | |
| 2005/0015404 A1 | 1/2005 | Cherkasova | |
| 2007/0113036 A1* | 5/2007 | Gal-Oz | G06F 3/0613 |
| | | | 711/165 |
| 2009/0187674 A1* | 7/2009 | Lee | H04L 29/12216 |
| | | | 709/250 |
| 2012/0233293 A1* | 9/2012 | Barton | G06F 11/1004 |
| | | | 709/219 |
| 2012/0311099 A1 | 12/2012 | Yoshida | |
| 2013/0304816 A1* | 11/2013 | Reguna | H04L 67/1095 |
| | | | 709/204 |
| 2013/0325895 A1 | 12/2013 | Peters et al. | |
| 2016/0154963 A1* | 6/2016 | Kumar | H04L 9/0822 |
| | | | 713/189 |
| 2016/0179642 A1* | 6/2016 | Cai | G06F 9/5083 |
| | | | 714/4.12 |
| 2016/0253119 A1* | 9/2016 | Reynolds | G06F 3/067 |
| | | | 711/170 |
| 2016/0261556 A1* | 9/2016 | Zheng | H04L 61/2503 |
| 2016/0357450 A1* | 12/2016 | Rao | G06F 3/0683 |
| 2018/0255138 A1* | 9/2018 | Hall | H04L 43/08 |
| 2018/0270144 A1* | 9/2018 | Jiang | H04L 45/123 |
| 2018/0287860 A1* | 10/2018 | Xia | H04W 74/0833 |
| 2019/0036648 A1* | 1/2019 | Yanovsky | G06F 3/0623 |

FOREIGN PATENT DOCUMENTS

| | | |
|---|---|---|
| CN | 105099946 B | 9/2018 |
| KR | 20060065239 A | 6/2006 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

List of IBM Patents or Patent Applications Treated as Related, Aug. 6, 2019, 2 pgs.

Unknown, "Scale-Out File Server for application data overview," https://docs.microsoft.com/en-us/windows-server/failover-clustering/sofs-overview, Apr. 26, 2018, 8 pgs.

Zhao et al., "Distribution From Multiple Servers to Multiple Nodes," U.S. Appl. No. 16/533,629, filed Aug. 6, 2019.

* cited by examiner

METHOD FOR INCREASING FILE TRANSMISSION SPEED

BACKGROUND

The present disclosure relates generally to the field of computer networks, and more specifically, to a method for increasing file transmission speed of a file server over a network.

In a large scale cluster environment, data transmission over a network typically uses an incremental deployment method to deploy a cluster from a server. Incremental deployment results in a large scale cluster being deployed to nodes in the network in a small scale step by step way. Generally, a file server transfers the data to a first node and the first node synchronizes the data to a second node. The second node synchronizes the data to a next node and the process repeats itself sequentially until all nodes in the network replicate the data.

SUMMARY

Embodiments of the present disclosure include a method for increasing file transmission speed of a server. The server may detect a plurality of nodes over a network. The server may determine that a data object stored by the server is to be replicated to the plurality of nodes, such that each node is to store a full copy of the data object. The server may divide the data object into a plurality of data pieces. The server may send a different data piece to each node of the plurality of nodes.

Additional embodiments of the present disclosure include a system for increasing file transmission speed over a network. The system includes a server communicatively coupled to a plurality of nodes over a network. The server may detect a plurality of nodes over the network. The server may determine that a data object stored by the server is to be replicated to the plurality of nodes, such that each node is to store a full copy of the data object. The server may divide the data object into a plurality of data pieces. The server may send a different data piece to each node of the plurality of nodes.

Further embodiments of the present disclosure include a method for replicating a data object over a plurality of nodes. Each node of the plurality of nodes may receive a different data piece of a plurality of data pieces from a server. Each node may send a copy of the data piece to all other nodes in the network. Each node may receive copies of all other data pieces from the other nodes. Each node may replicate a full copy of the data object from the plurality of data pieces.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
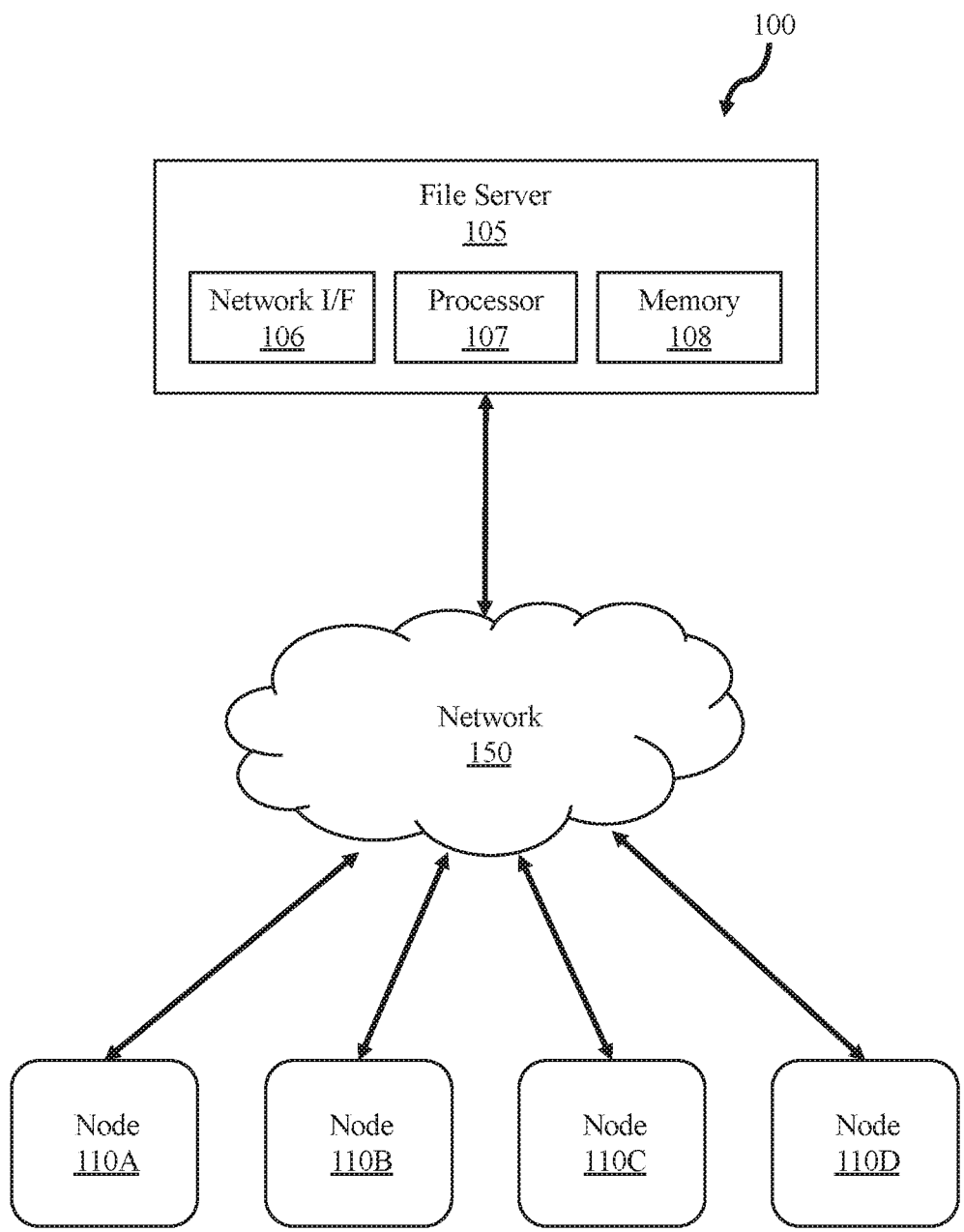
FIG. 1 illustrates an example system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer networks, and more particularly to increasing file transmission speed of a file server over a network. While the present disclosure is not necessarily limited to such applications, various aspects of the disclosure may be appreciated through a discussion of various examples using this context.

In a large scale cluster environment, data transmission over a network typically uses an incremental deployment method to deploy a cluster. Data transmission from a file server to multiple nodes using incremental deployment typically flows in a linear fashion. Data transmitted from the server is sent to a first node, then subsequently sent from the first node to a second node, and so on until all nodes in the network have replicated the data. This approach may have drawbacks. Typically, a file server has a network bandwidth that is much higher than any single node. Depending on the bandwidth of each node, the server may experience wasted bandwidth while waiting for data transmission to the first node to be completed. Further, the incremental deployment method may slow data transmission requests from other nodes creating a data transmission bottleneck at the file server.

For example, a server with a 10G bandwidth (e.g., an ability to transmit 10 Gbits per second) may only utilize 2G of bandwidth when sending data to a first node having a 2G bandwidth using the incremental deployment approach. Once data transmission to the first node is complete, the file server may transmit data to another node at a similar 2G bandwidth speed, while the first node replicates the data to a second node and so on. In this instance, 8G of the server's bandwidth remains unused during each data transmission from server to node, preventing efficient data transmission.

Embodiments of the present disclosure provide a method to improve file transmission speed of a file server by reducing a data object (e.g., data file, image, document, etc.) into multiple data pieces in order to send the data pieces to multiple nodes simultaneously. Once a node receives a data piece, a copy of the data piece is synchronized to all remaining nodes in the network. Once each node receives all the data pieces from each of the other nodes, a full copy of the data object can be replicated across all of the nodes. In this way, the file server can utilize its full bandwidth by sending data pieces to all the nodes simultaneously rather than sending a full copy of the data object to one node at a time following an incremental deployment approach.

For example, a server with a 10G bandwidth may detect five nodes on a network, each node having a 2G bandwidth. In order to speed up file transmission of a data object to all the nodes, the server may divide the data object into five pieces (e.g., matching the number of nodes on the network) in order to utilize the server's full bandwidth. In this example, the data object will be split into five equally sized data pieces, and a different data piece will be sent to each of the nodes at a 2G bandwidth simultaneously. This multiple deployment approach allows the file server to utilize its full 10G bandwidth. Once all data pieces are sent to the respective nodes, the file server is free to serve other data requests using the server's full network bandwidth.

In some embodiments, once each of the nodes receives its respective data piece, each node sends a copy of the data piece to each of the other nodes in the network. Once all data pieces are received by each node, a full copy of the data object may be replicated across all nodes without tying up the bandwidth of the server. Utilizing the full bandwidth capacity of the file server may allow transmission of data to be optimized to the server's full potential.

In another embodiment, the file server may divide the data object into larger and smaller data pieces based on a bandwidth ratio between each node detected in the network and the file server. For example, a file server having a 12G bandwidth may detect two nodes within the network. The first node may have a 1G bandwidth, while the second node may have a 2G bandwidth. In this instance, the file server would divide the data object into two data pieces (one for each node) where the size of the pieces would differ based on the bandwidth ratio. Here, the size of the data piece sent to the first node ($12 \times 1/3 = 4$) would be half the size of the data piece sent to the second node ($12 \times 2/3 = 8$) to accommodate differences in bandwidth between the nodes. The file server may also consider the speed between the individual nodes when determining the size of the individual pieces sent to individual nodes. In this way, the size of each of the data pieces sent to the first node and second node, respectively, is selected to produce the quickest file transmission speed from the file server.

Embodiments of the present disclosure provide an improvement in file transmission speed from a file server to a plurality of nodes using a multiple deployment approach. In one example, the multiple deployment approach reduces the time occupied by the server by 5-fold over the incremental deployment method when deploying a data object to the plurality of nodes.

For example, using the multiple deployment approach, a file server having a 10G bandwidth may split a 100 gigabyte (GB) data object into five 20 GB data pieces to deploy to five nodes each having a 2G bandwidth. Using the multiple deployment method reduces the time the file server is occupied by 5-fold versus deploying the full 100 GB data object to a single node at 2G. Using the multiple deployment approach, the time occupied by the server is significantly decreased, while the time taken to replicate the data object across all the nodes remains the same.

It is to be understood that the aforementioned advantages are example advantages and should not be construed as limiting. Embodiments of the present disclosure can contain all, some, or none of the aforementioned advantages while remaining within the spirit and scope of the present disclosure.

With reference now to FIG. 1, shown is an example network architecture 100, in accordance with embodiments of the present disclosure. The network architecture 100 is presented only by way of example and is not intended to be limiting. The systems and methods disclosed herein may be applicable to a wide variety of different computers, servers, storage devices, network architectures, etc., in addition to the network architecture 100 as shown.

In the illustrative embodiment, the network architecture 100 includes a file server 105, communicatively connected by a network 150 with nodes 110A, 110B, 110C, 110D (collectively referred to as node 110). The network 150 may be any type of computing network, such as a cloud computing network. Consistent with various embodiments, a cloud computing environment may include a network-based distributed data processing system that provides one or more cloud computing services. Further, a cloud computing environment may include many computers (e.g., hundreds or thousands of computers or more) disposed within one or more data centers and configured to share resources over the network 150. The network 150 may be substantially similar to, or the same as, network 50 described in FIG. 6 and FIG. 7.

In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the file server 105 may communicate with the nodes 110 using a local area network (LAN), one or more hardwire connections, a wireless link or router, or an intranet. In some embodiments, the various systems may be communicatively coupled using a combination of one or more networks and/or one or more local connections. For example, the file server 105 may communicate with node 110A using a wireless network (e.g., a router), while node 110B may be hardwired (e.g., connected with an Ethernet cable) to the file server 105.

The file server and the nodes 110 may be distant from each other and communicate over network 150. In some embodiments, the file server 105 may be a central hub from which each node 110 can establish a communication connection, such as in a client-server networking model. Alternatively, the filer server and nodes 110 may be configured in any other suitable networking relationship (e.g., using any other network topology).

Figure 5:
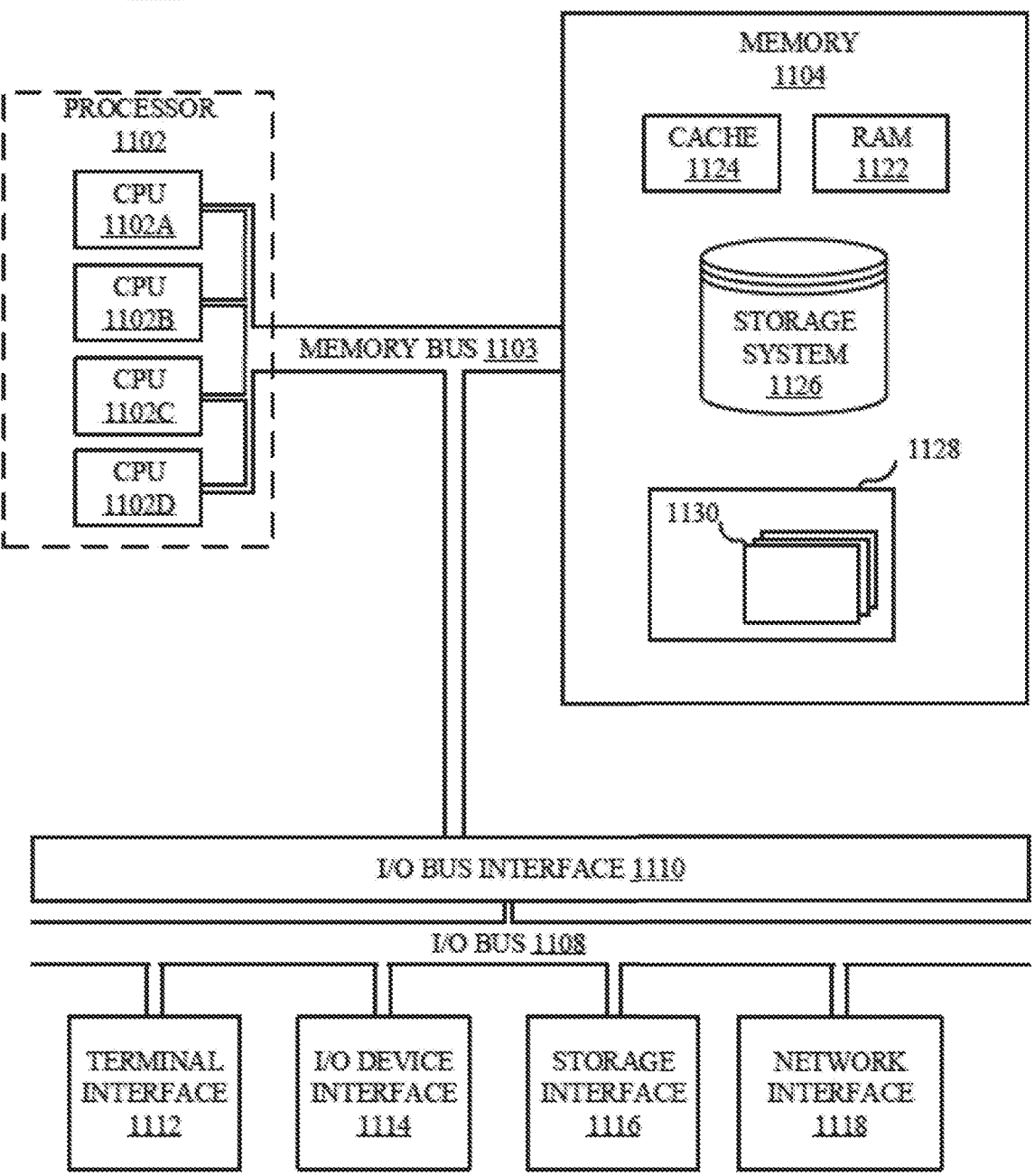
FIG. 5 illustrates a high-level block diagram of an example computer system that may be used in implementing one or more of the methods, tools, and modules, and any related functions, described herein, in accordance with embodiments of the present disclosure.

In some embodiments, the file server 105 and the nodes 110 may be any type of computer system and may be substantially similar to computer system 1101 of FIG. 5. In the illustrative embodiment, the file server 105 includes a network interface 106, a processor 107, and a memory 108. While not shown, each of the nodes 110 may similarly include one or more processors, memories, and network interfaces. The memory 108 may include an operating system and one or more applications configured to utilize (e.g., access) data stored on the file server 105. The network interface 106 may enable the file server 105 to connect to the network 150 to communicate with the connected nodes 110. Further it is contemplated that each node 110 within the network architecture 100 may further communicate with the other nodes 110 over the network 150.

In some embodiments, the file server 105 may be equipped with a display or monitor. The file server 105 may include optional input devices (e.g., a keyboard, mouse, scanner, or other input devices), and/or any commercially available or customer software (e.g., browser software, communications software, server software, natural language processing software, search engine and/or web crawling software, filter modules for filtering content based upon predefined parameters, etc.).

It is noted that FIG. 1 is intended to depict the representative major components of an exemplary network architecture 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the network architecture 100 may not be present, and the arrangement of components may vary.

For example, while FIG. 1 illustrates an example network architecture 100 having a single file server 105 and four nodes 110, suitable network architectures for implementing embodiments of this disclosure may include any number of servers and nodes. The various models, modules, systems, and components illustrated in FIG. 1 may exist, if at all, across a plurality of servers and nodes.

Figure 2A:
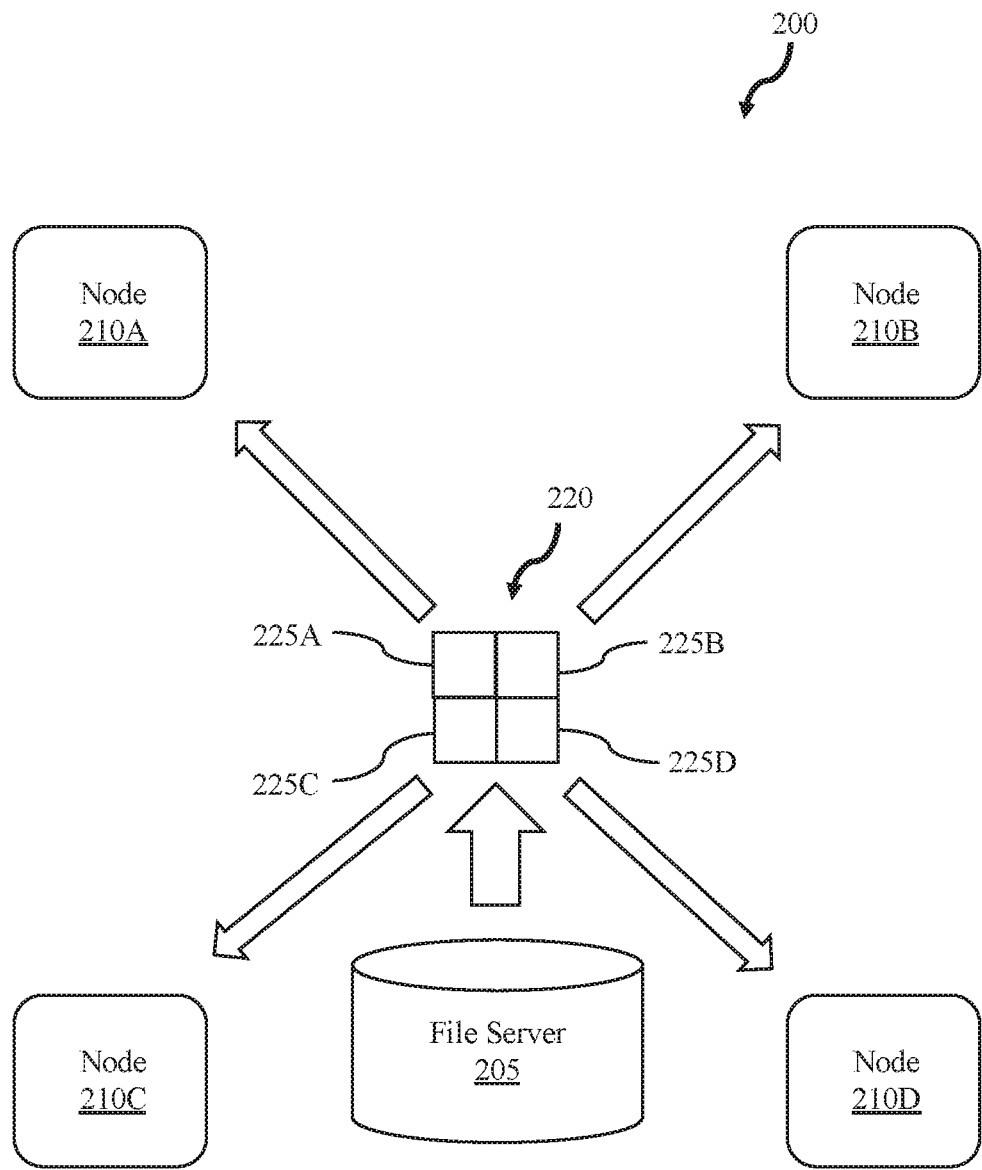
FIG. 2A illustrates an example of reducing a data object into data pieces, in accordance with embodiments of the present disclosure.

Referring now to FIG. 2A, shown is an example diagram of reducing a data object 220 into data pieces, in accordance with embodiments of the present disclosure. In some embodiments, file server 205 detects a plurality of nodes 210A, 210B, 210C, 210D (collectively referred to as node 210) over a network (shown as network 150 in FIG. 1). In some embodiments, the file server 205 may determine the total number of detected nodes 210 and divide the data object 220 (e.g., data file) into a plurality of data pieces 225A, 225B, 225C, 225D (collectively referred to as data piece 225) equal to the total number of nodes 210 (shown here as four nodes). Each data piece 225 is then sent from the file server 205 to the respective node 210 over the network. For example, data piece 225A will be sent to node 210A, data piece 225B will be sent to node 210B, data piece 225C will be sent to node 210C, and data piece 225D will be sent to node 210D.

In some embodiments, the file server 205 may determine the bandwidth of each of the detected nodes 210 to establish a bandwidth ratio between the file server and each node. In some embodiments, all nodes 210 may have the same bandwidth. Once the bandwidth ratio is determined, the file server 205 may divide the data object 220 into data pieces that include a data size corresponding to the bandwidth ratio between the respective node and the file server.

For example, a node with a 2G bandwidth may receive a data piece that is two times larger than a node with a 1G bandwidth based on the bandwidth ratio. In other embodiments, the data object 220 may be split into equally sized data pieces if all the nodes have the same bandwidth. For example, data object 220 will be divided into four equally sized data pieces corresponding to the detection of four nodes 210A, 210B, 210C, 210D having the same bandwidth.

Figure 2B:
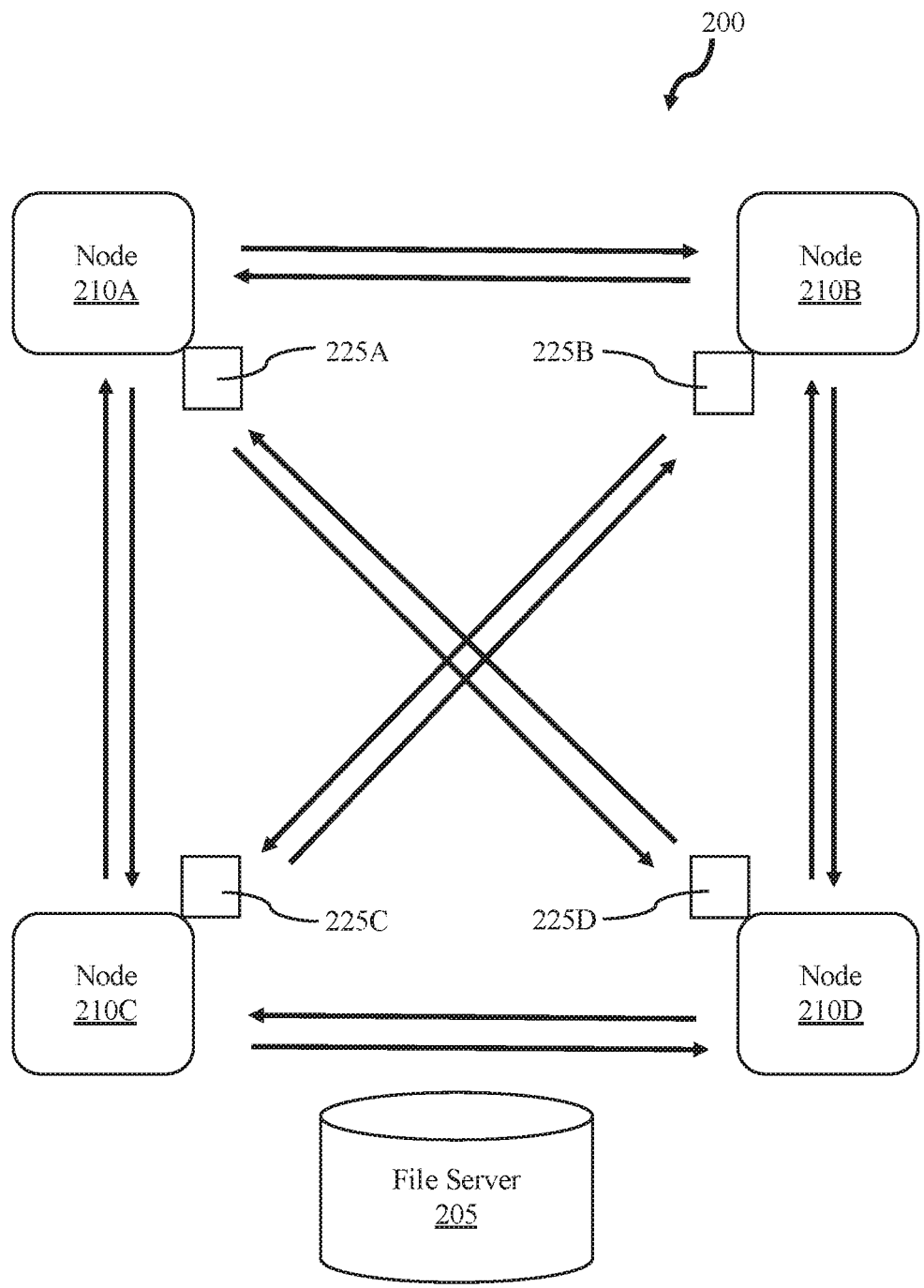
FIG. 2B illustrates an example of data piece replication between nodes, in accordance with embodiments of the present disclosure.

Referring now to FIG. 2B, shown is an example of data piece 225 replication between nodes 210, in accordance with embodiments of the present disclosure. In the illustrated embodiment, each node 210 receives a data piece 225 from the file server 205. Once received, each node 210 is configured to replicate the data piece 225 and send a copy of the data piece to the other nodes 210 within the system 200. For example, node 210A may receive data piece 225A from file server 205. Once received, node 210A will replicate the data piece 225A and send a copy of data piece 225A to each of the other nodes (e.g., 210B, 210C, 210D) within the system 200. Each of the other nodes 210B, 210C, 210D will replicate its respective data piece 225B, 225C, 225D, and send a copy to the other nodes. In this way, each node 210 will receive a copy of each data piece 225A, 225B, 225C, 225D. In some embodiments, the sending of each data piece 225 and receiving the other data pieces from each node 210 may occur simultaneously.

Figure 2C:
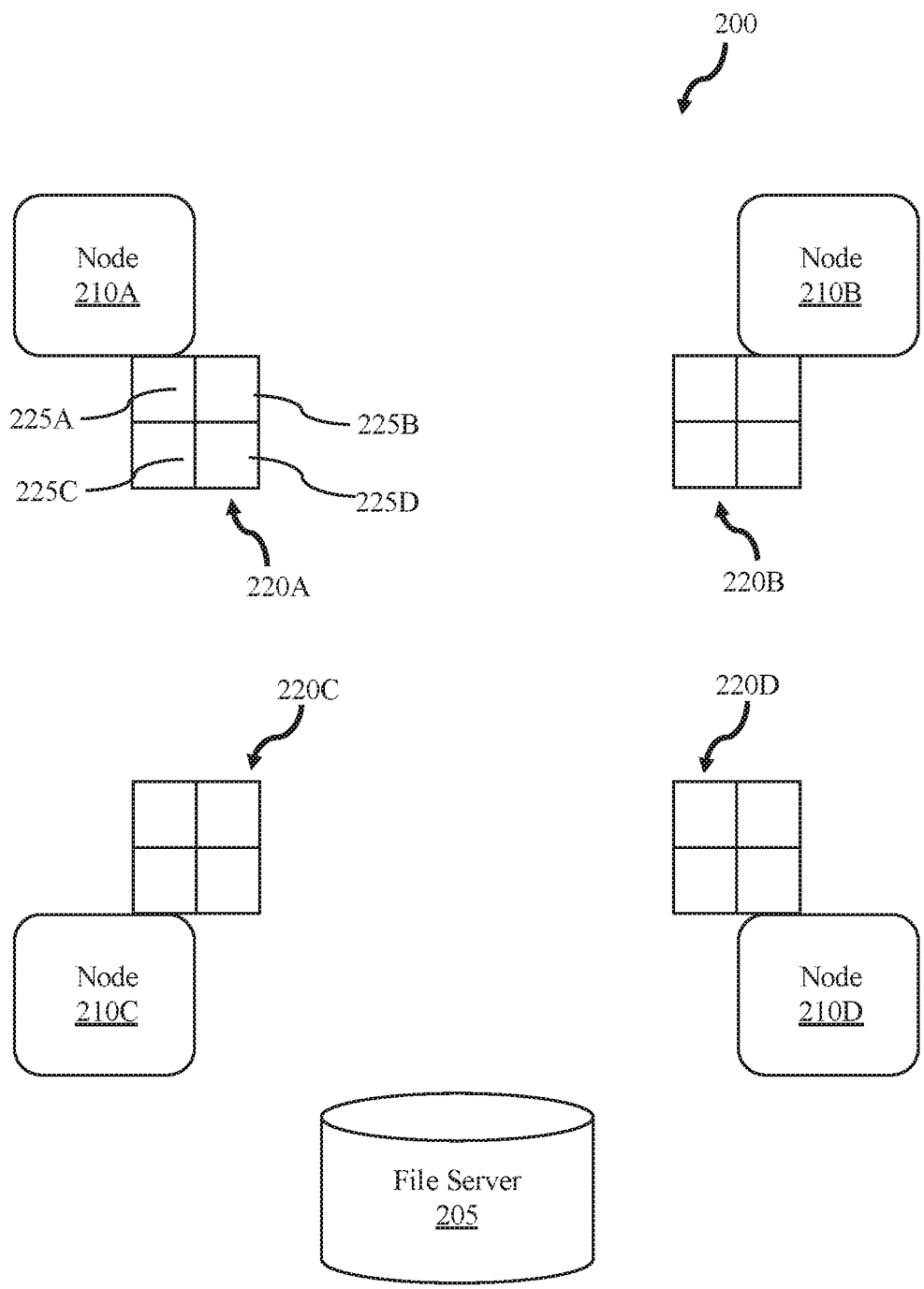
FIG. 2C illustrates an example of data object replication between nodes, in accordance with embodiments of the present disclosure.

Referring now to FIG. 2C, shown is an example of data object 220 replication between nodes 210, in accordance with embodiments of the present disclosure. Once each node 210 receives a copy of all the other data pieces 225 from the other nodes 210, each node is able to replicate a full copy of the data object 220A, 220B, 220C, 220D (collectively referred to as data object 220) that is on the file server 205. Replicating the data object 220 from data pieces 225 sent between the nodes 210 allows the file server 205 to be free to move on to a next file request.

In some embodiments, the file server 205 may generate a mapping table or other metadata that describes how the data pieces 225 should be arranged. This mapping may be transmitted by the file server 205 to one or more of the nodes 210 (e.g., it may be transmitted to each node, or it may be transmitted to a single node much like each individual data piece is). The nodes 210 may use the received mapping to reassemble the data pieces 225 into a complete copy of the object 220.

Figure 3:
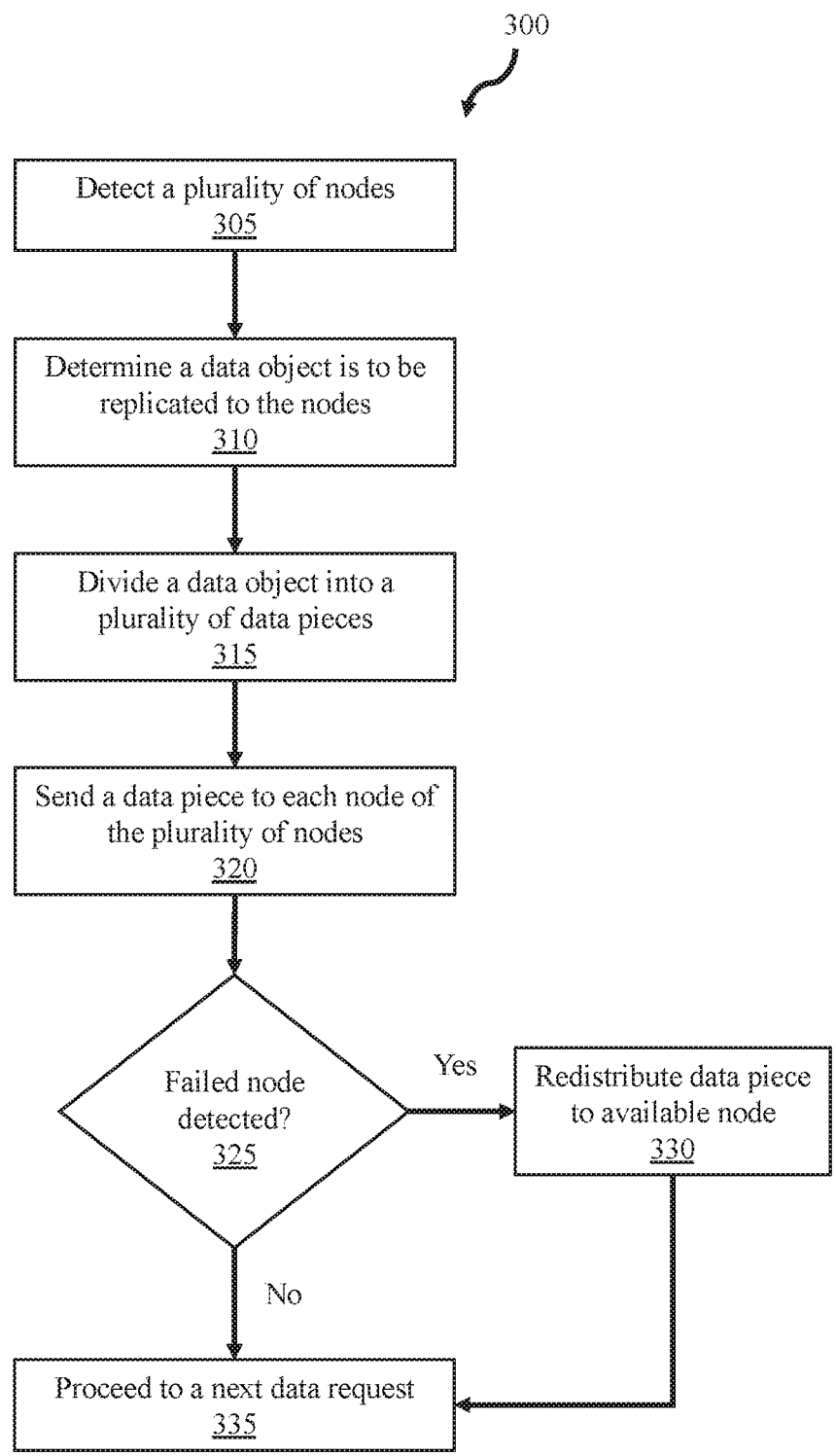
FIG. 3 illustrates a flow diagram of an example process for sending data pieces to a plurality of nodes, in accordance with embodiments of the present disclosure.

Referring now to FIG. 3, shown is a flow diagram of an example process 300 for sending data pieces to a plurality of nodes, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 107 of file server 105 exemplified in FIG. 1.

The process 300 begins by the file server detecting a plurality of nodes over a network. This is illustrated at step 305. The plurality of nodes may be computer systems (e.g., servers, compute nodes, storage devices, etc.) configured to store a complete copy of a data object. The process 300 continues by determining a data object is to be replicated to the plurality of nodes. This is illustrated at step 310. Once the file server determines the data object is to be replicated to the plurality of nodes, the process 300 continues by dividing a data object into a plurality of data pieces equal to the number of nodes. This is illustrated at step 315. In the example shown in FIGS. 2A-2C, the data object is divided into four data pieces, which is equal to the number of nodes. In other embodiments, the data object may be divided into any amount of data pieces. In some embodiments, the size of each data piece sent to each node may be determined by a bandwidth ratio between the file server and the respective node.

Once the data object is divided into a plurality of data pieces, the process 300 continues by sending a different data piece of the data object to each of the nodes. This is illustrated at step 320. Splitting the data object into multiple pieces and sending one of the data pieces to each of the nodes increases the transmission speed of the file server. Once the data object is transferred to the nodes in pieces, the file server is free to process other file requests. This is illustrated at step 335.

In some embodiments, one or more of the nodes may experience failure. In such an instance, the file server may detect the failed node. This is illustrated at step 325. In some embodiments, error handling of node failure may be performed by a management platform within the system. In this way, new nodes may become available in order to receive data in the event of a node failure. If a node experiences failure, the data piece meant for the failed node may be redistributed to one or more available nodes (e.g., a new node, or redistributed to the remaining nodes) by file server. This is illustrated at step 330. Once the data piece is redistributed to an available node the filer server may proceed to the next data request. This is illustrated in step 335.

In some embodiments, the number of data pieces does not correspond exactly to the number of nodes to which replication is required. For example, one or more nodes may not have a communication link established with the file server (e.g., in the case of a hybrid cloud environment, one or more private nodes may not have a direct link to the file server). These nodes may instead receive the data from the plurality of nodes that are connected to the file server. Similarly, if the communication link between a particular node and the file server is much slower than the link between that node and a different node, or if the communication link is sporadic or otherwise likely to fail, the file server may ignore the particular node in order to optimize file server transmission speeds. The ignored node may instead receive a copy of the data object from one or more of the other nodes.

Figure 4:
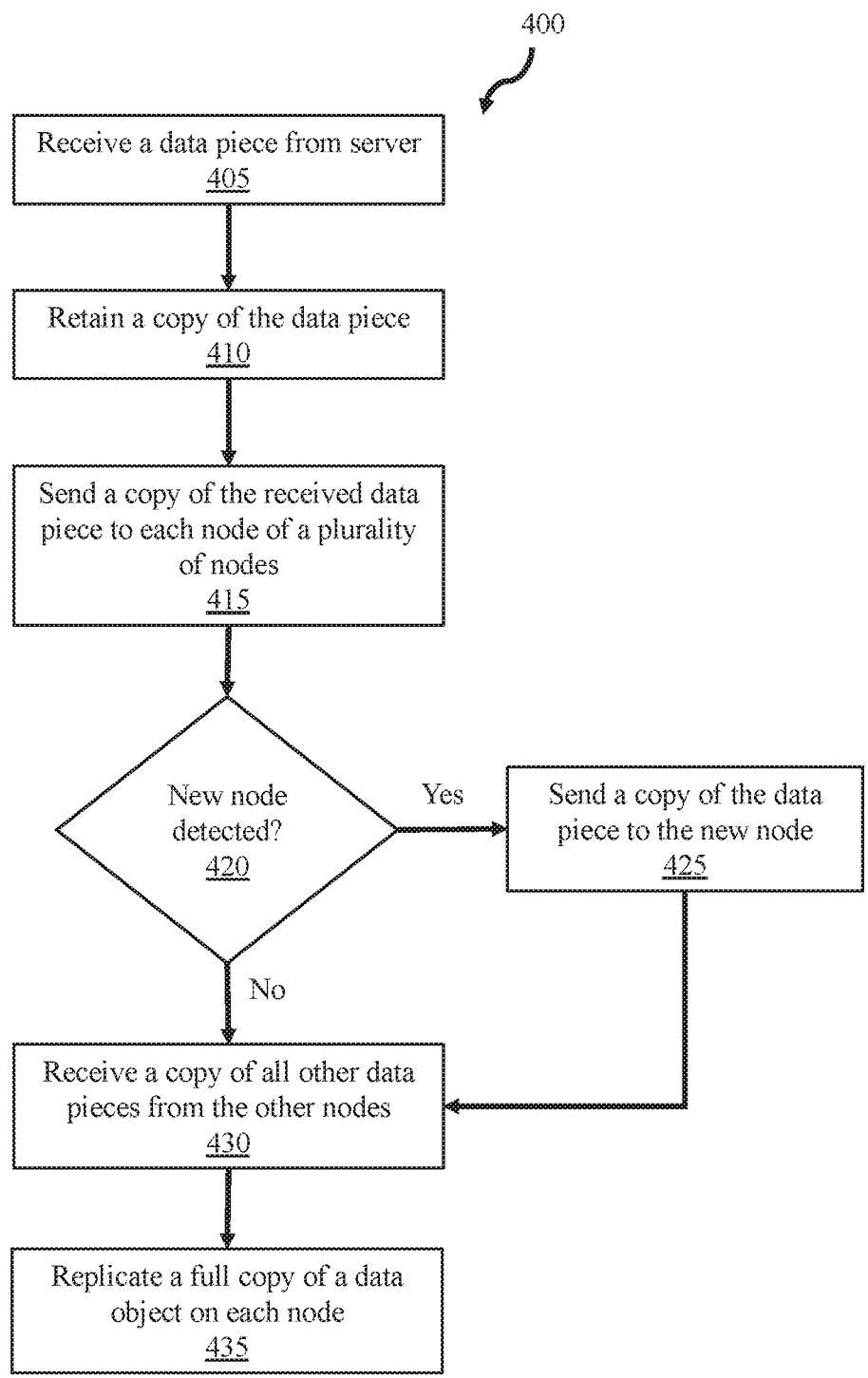
FIG. 4 illustrates a flow diagram of an example process for replicating a full copy of a data object across a plurality of nodes, in accordance with embodiments of the present disclosure.

Referring now to FIG. 4, shown is a flow diagram of an example process 400 for replicating data pieces into a data object across a plurality of nodes, in accordance with embodiments of the present disclosure. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. The process 400 may be performed by a processor of each node 110 exemplified in FIG. 1.

The process 400 begins by each node receiving a data piece from a file server. This is illustrated at step 405. The data piece received is one of a plurality of data pieces that make up a data object (e.g., as shown FIGS. 2A-2C) stored on a file server. Once received, each node retains a copy of the data piece. This is illustrated at step 410. The process 400 continues by sending a copy of the data piece to each other node of a plurality of nodes within the network. This is illustrated at step 415. The process 400 continues by determining if one or more new nodes are present in the network. This is illustrated at step 420. In no new nodes are detected the process 400 continues by each of the nodes receiving a copy of all other data pieces from the remaining nodes. This is illustrated in step 430. In some embodiments, step 415 and 430 may occur simultaneously.

In some embodiments, a node within the plurality of nodes may experience a failure. In such an instance a new node (e.g., initiated by a management platform within the network) may come online to replace a failed node. In such an embodiment, the process 400 may continue by each node detecting one or more new nodes. This is illustrated at step 420. If a new node is detected, the process 400 continues by each node sending a copy of the data piece to the new node. This is illustrated at step 425. In this way, a new node will receive copies of all the data pieces from the other nodes as illustrated in step 430.

Once a node receives a copy of all the data pieces, that node continues the process 400 by replicating a full copy of the data object from the data pieces. This is shown at step 435. In some embodiments, the nodes may use a mapping provided by the file server to determine how to recombine the data pieces. Each node may recombine the data pieces into a full copy of the object once all of the data pieces are received. In some embodiments, the nodes may begin recombining data pieces as soon as it can, even if it has not received all of the data pieces. In this way, each node may replicate a full copy of the data object maintained on the server without having to receive the entire data object from the file server itself. This approach increases file transmission speed of data objects from the server to nodes within the system.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300 and 400).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
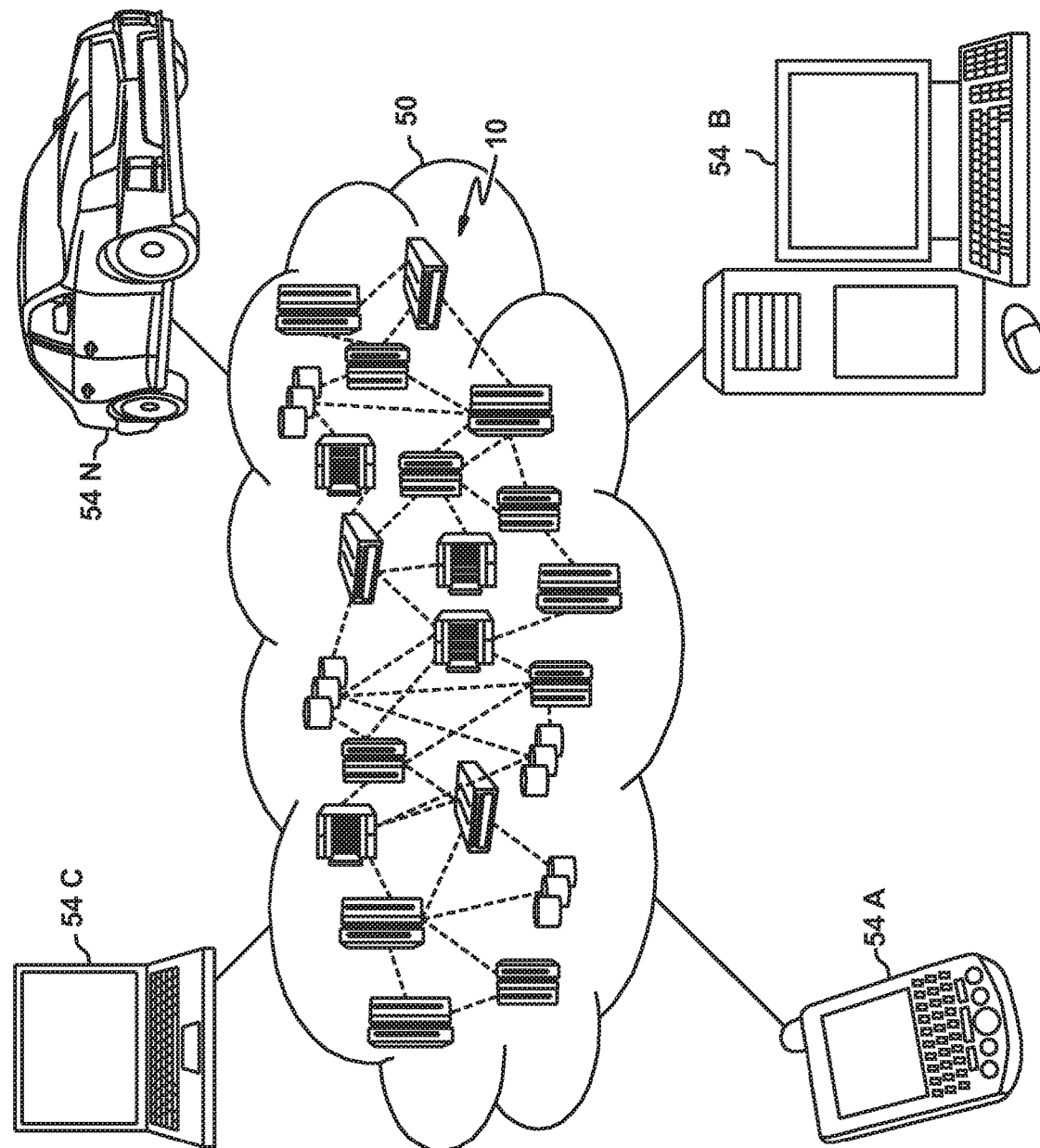
FIG. 6 depicts a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
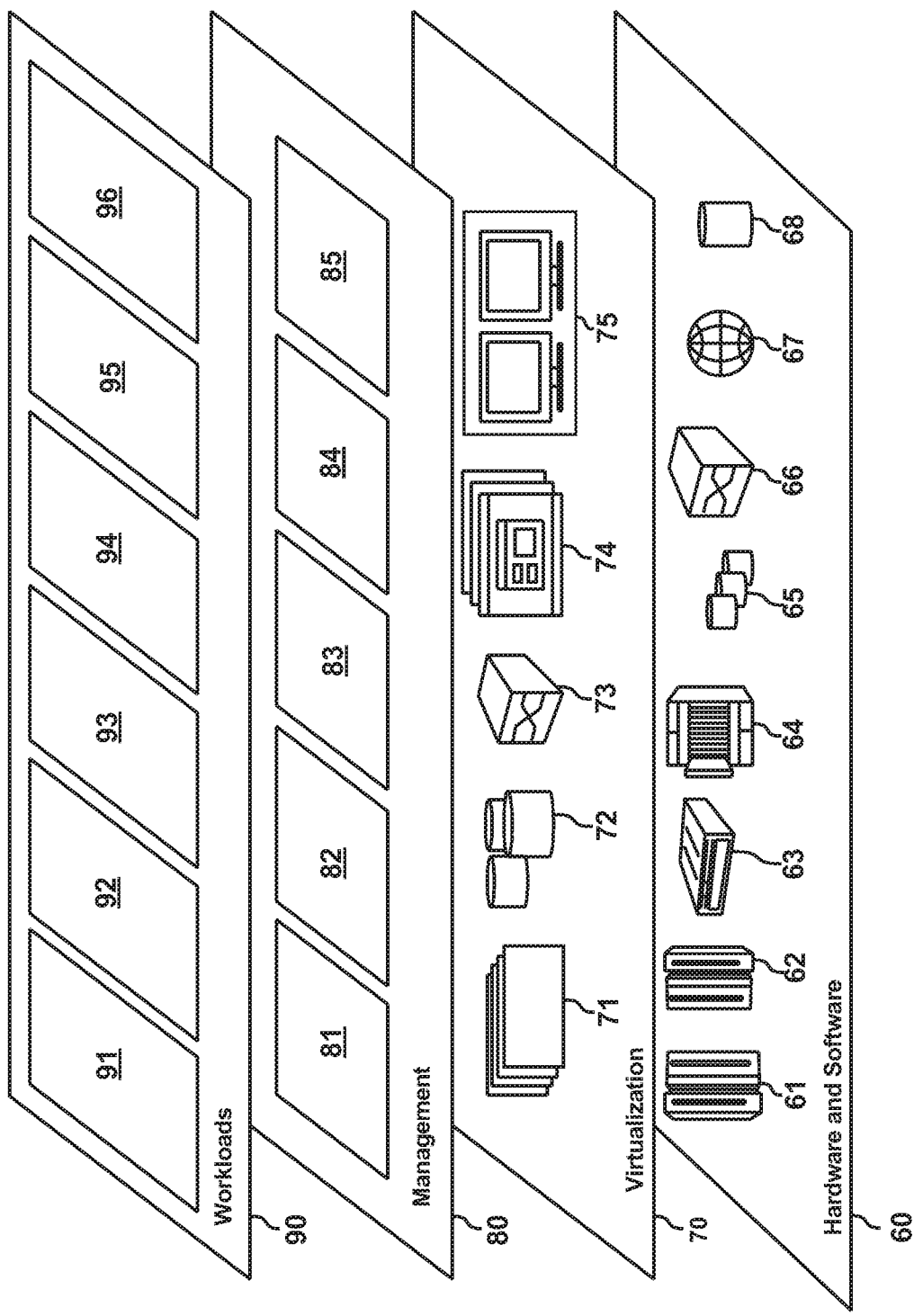
FIG. 7 depicts abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer-implemented method comprising:
    detecting, by a server, a plurality of nodes over a network;
    determining, by the server, that a data object stored by the server is to be replicated to the plurality of nodes, wherein each node is to store a full copy of the data object;
    dividing, by the server, the data object into a plurality of data pieces;
    sending, by the server, a different data piece of the plurality of data pieces to each node of the plurality of nodes; and
    sending, by the server, a mapping table to one or more nodes of the plurality of nodes, wherein the mapping table indicates how the plurality of data pieces are reassembled into the full copy of the data object, and
    wherein the mapping table is received by a first node and sent by the first node to a second node of the plurality of nodes.

2. The method of claim 1, wherein dividing the data object into a plurality of data pieces further comprises:
    determining, by the server, a total number of nodes of the plurality of nodes; and
    dividing, by the server and in response to the determined total number of nodes, the data object by the total number of nodes to obtain an equal number of data pieces.

3. The method of claim 1, wherein a size of each data piece sent to each node is determined by a bandwidth ratio between each respective node and the server.

4. The method of claim 1, the method further comprising:
    detecting, by the server, one or more node failures; and
    redistributing, by the server and in response to detecting one or more node failures, one or more data pieces to one or more existing nodes.

5. The method of claim 1, the method further comprising:
    receiving, by each node of the plurality of nodes, the data piece of the plurality of data pieces sent from the server, wherein the server moves on to a next file request once each respective data piece is fully received by each node;
    sending, by each node and in response to receiving the data piece from the server, a copy of the received data piece simultaneously to all other nodes of the plurality of nodes;
    receiving, by each node and in response to sending the copy of the data piece, copies of all other data pieces from the other nodes; and
    replicating, by each node and in response to receiving copies of all other data pieces, a full copy of the data object.

6. The method of claim 5, the method further comprising:
    detecting, by each node, one or more new nodes; and
    sending, by each node and in response to detecting one or more new nodes, a copy of the data piece received from the server to the one or more new nodes.

7. The method of claim 5, wherein replicating the full copy of the data object comprises:
    analyzing, by each node, the mapping table received from the server; and
    reassembling, by each node and using the mapping table, the copies of all the data pieces into the full copy of the data object.

8. A system comprising:
    a plurality of nodes;
    a network; and
    a server, wherein the server includes a processor configured to perform a method, the method comprising:
        detecting the plurality of nodes over the network;
        determining that a data object stored by the server is to be replicated to the plurality of nodes, wherein each node is to store a full copy of the data object;
        dividing the data object into a plurality of data pieces;
        sending a different data piece of the plurality of data pieces to each node of the plurality of nodes; and
        sending a mapping table to one or more nodes of the plurality of nodes, wherein the mapping table indicates how the plurality of data pieces are reassembled into the full copy of the data object, and
        wherein the mapping table is received by a first node and sent by the first node to a second node of the plurality of nodes.

9. The system of claim 8, wherein dividing the data object into a plurality of data pieces further comprises:
    determining a total number of nodes of the plurality of nodes; and
    dividing, in response to the determined total number of nodes, the data object by the total number of nodes to obtain an equal number of data pieces.

10. The system of claim 8, wherein a size of each data piece of the plurality of data pieces sent to each node is determined by a bandwidth ratio between each respective node and the server.

11. The system of claim 8, wherein the method performed by the processor further comprises:
    detecting one or more node failures; and
    redistributing one or more data pieces to one or more existing nodes.

12. The system of claim 8, wherein each node of the plurality of nodes is configured to:
    receive the data piece of the plurality of data pieces sent from the server, wherein the server moves on to a next file request once each respective data piece is received by each node;
    send, in response to receiving the data piece from the server, a copy of the received data piece simultaneously to all other nodes of the plurality of nodes;
    receive, in response to sending the copy of the data piece to the other nodes, copies of all other data pieces from the other nodes; and
    replicate, in response to receiving copies of all other data pieces, a full copy of the data object.

13. The system of claim 12, wherein each node of the plurality of nodes is further configured to:
    detect one or more new nodes; and
    send, in response to detecting one or more new nodes, a copy of the data piece received from the server to the one or more new nodes.

14. A computer program product for replicating a data object across a plurality of nodes, the computer program product comprising a computer readable storage medium having program instructions embodied therewith, the program instructions executable by a processor to cause the processor to perform a method comprising:
- detecting a plurality of nodes over a network;
- determining that a data object stored on a server is to be replicated to the plurality of nodes, wherein each node is to store a full copy of the data object;
- dividing the data object into a plurality of data pieces;
- sending a different data piece of the plurality of data pieces to each node of the plurality of nodes; and
- sending a mapping table to a first node of the plurality of nodes, wherein the mapping table indicates how the plurality of data pieces are reassembled into the full copy of the data object, and
- wherein the mapping table is received by the first node and sent by the first node to a second node of the plurality of nodes.

15. The computer program product of claim 14, wherein dividing the data object into the plurality of data pieces further comprises:

- determining a total number of nodes of the plurality of nodes; and
- dividing, in response to the determined total number of nodes, the data object by the total number of nodes to obtain an equal number of data pieces.

16. The computer program product of claim 14, wherein a size of each data piece sent to each node is determined by a bandwidth ratio between each respective node and the server.

17. The computer program product of claim 14, wherein the method performed by the processor further comprises:

- detecting one or more node failures; and
- redistributing, in response to detecting one or more node failures, one or more data pieces to one or more existing nodes.

* * * * *